Nov. 11, 1924.
A. J. FINNEGAN
VEHICLE FENDER
Filed April 10, 1924      2 Sheets-Sheet 1
1,515,566
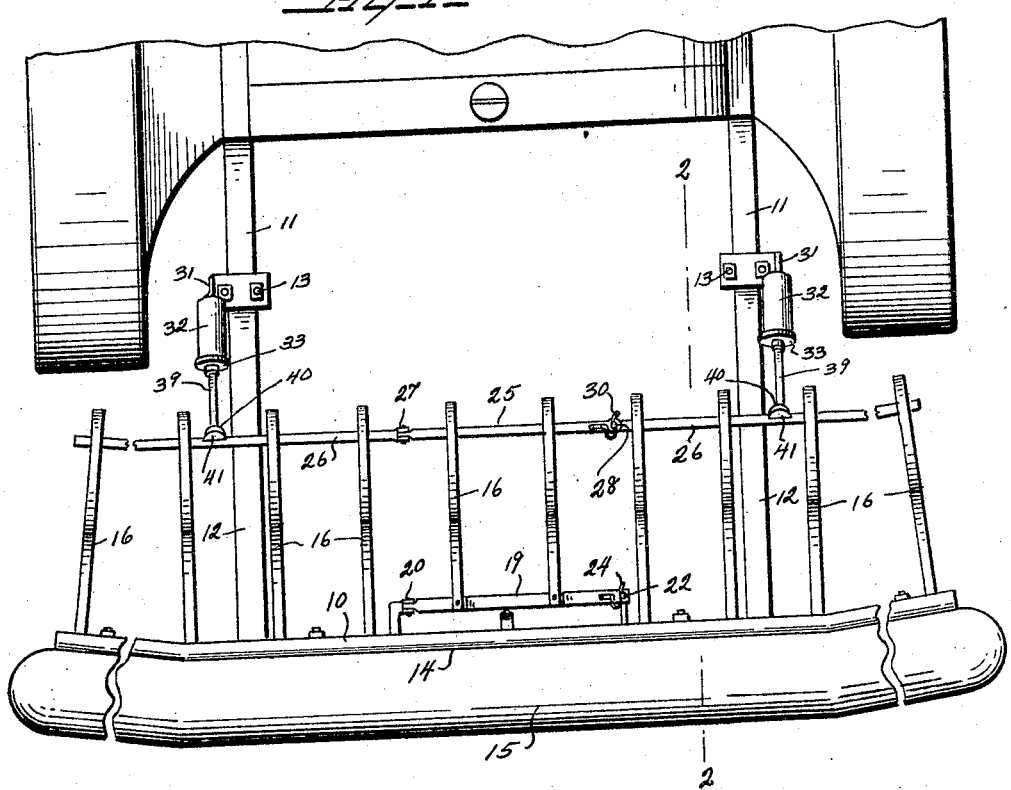
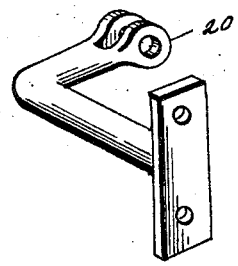
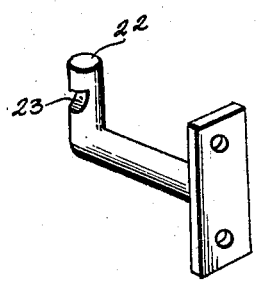
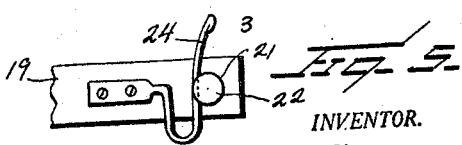
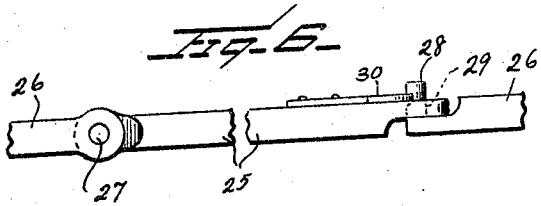
INVENTOR.
A. J. Finnegan
BY Watson E. Coleman
ATTORNEY.

Nov. 11, 1924.  1,515,566
A. J. FINNEGAN
VEHICLE FENDER
Filed April 10, 1924  2 Sheets-Sheet 2
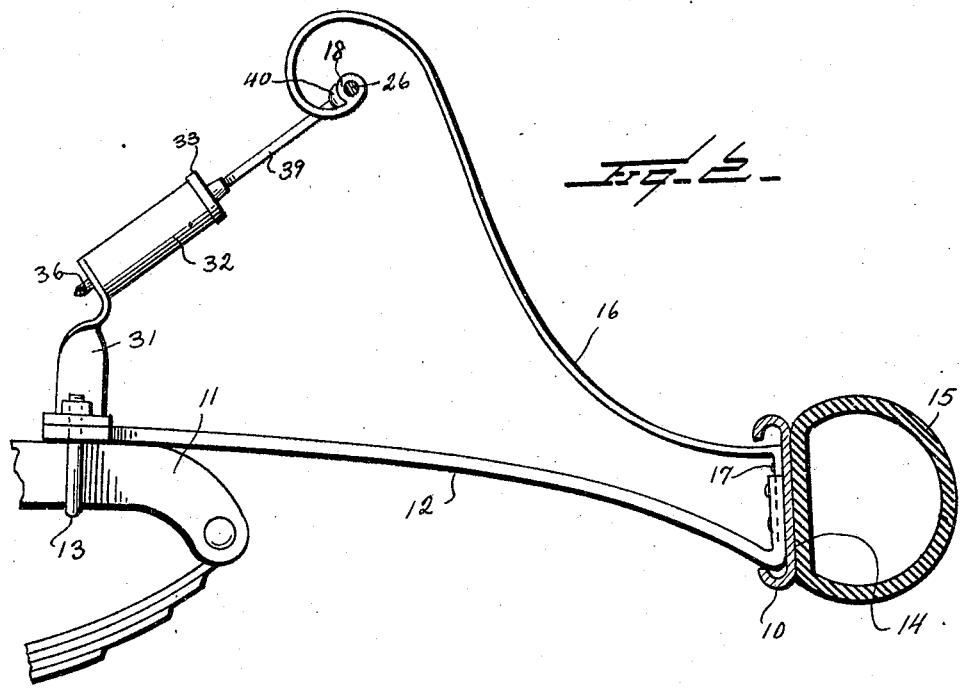
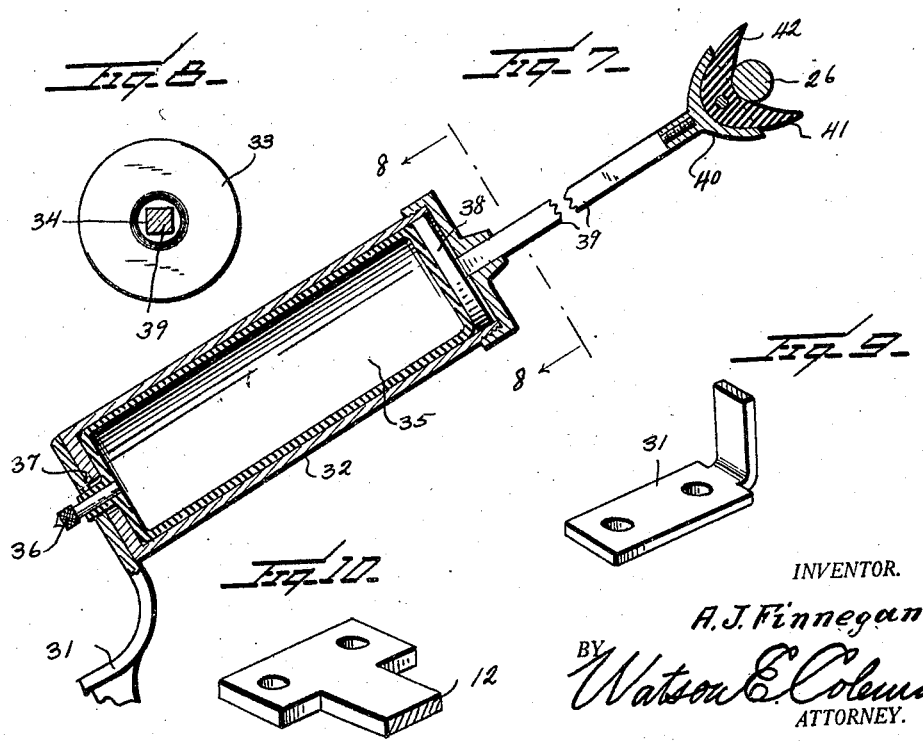
INVENTOR.
A. J. Finnegan
BY Watson E. Coleman
ATTORNEY.

Patented Nov. 11, 1924.

1,515,566

UNITED STATES PATENT OFFICE.

AMBROSE J. FINNEGAN, OF CASTALIA, IOWA.

VEHICLE FENDER.

Application filed April 10, 1924. Serial No. 705,586.

*To all whom it may concern:*

Be it known that I, AMBROSE J. FINNEGAN, a citizen of the United States, residing at Castalia, in the county of Winneshiek and State of Iowa, have invented certain new and useful Improvements in Vehicle Fenders, of which the following is a specification, reference being had to the accompanying drawings.

This invention relates to improvements in vehicle fenders and more particularly to vehicle fenders of the rigid type.

An important object of the invention is to provide in combination with a rigid fender bar a cushioning element arranged directly upon the front face of and attached to the fender bar for lessening the shock of impact when a solid substance is encountered and for rendering less likely damage to pedestrians engaged by such fender bar.

A further object of the invention is to provide the combination with a rigid fender bar arranged so that pedestrians struck thereby will be thrown over the fender bar, of means supported between the fender bar and vehicle frame for receiving a person or article passing over the rigid fender bar to prevent contact with the solid metal of the frame.

A further object of the invention is to provide a receiving apparatus of this character which is yieldable and which accordingly cushions the fall of the pedestrian to prevent injury.

A still further object of the invention is to provide a shield of this character so constructed that a section thereof is readily moved out of the way in order to permit hand starting of the engine of the vehicle when this is necessary.

The invention further resides in the details and arrangement of the structure hereinafter set forth as shown in the accompanying drawings in which:—

Figure 1 is a plan view of a fender apparatus constructed in accordance with my invention applied to a vehicle;

Figure 2 is a section on the line 2—2 of Figure 1;

Figure 3 is a detail of the hinged mounting for connecting the shiftable section of the fender to the rigid fender bar;

Figure 4 is a perspective view of the hook section of the latch for securing the hinged mounting in position;

Figure 5 is a plan view of the latch section complete;

Figure 6 is a side elevation thereof;

Figure 7 is a detail sectional view through the pneumatic cushioning element of the spring fingers;

Figure 8 is a section on the line 8—8 of Figure 7;

Figures 9 and 10 are fragmentary perspective views showing the mounting ends of the pneumatic cushioning element support and rigid fender support respectively.

Referring now more particularly to the drawings, the numeral 10 indicates a rigid fender bar extending transversely of the vehicle in advance thereof and supported from the side members of the vehicle frame 11 by rearwardly extending bracing and supporting bars 12 which are secured to the vehicle frame by clamping U-bolts 13. The front face of the bar 10 is flat and has arranged thereagainst the flattened rear face 14 of an inflatable cushioning element 15 secured to the bar in any suitable manner.

The numeral 16 designates a plurality of upwardly and rearwardly extending spring fingers each having at its lower end an attaching portion 17 and at its upper end an eye 18. Certain of these elements have their attaching portions rigidly secured to a bar 19 which is pivoted at one end to the rear face of the bar 10 as indicated at 20. At its opposite end the bar 19 is provided with an eye 21 adapted for the reception of a hook 22 supported from the bar 10, this hook having a notch 23 formed therein which when the eye 21 is fully engaged with the hook aligns with a spring latch 24 carried by the bar to lock the bar in position. The remainder of the spring fingers 16 are directly attached to the bar at spaced intervals at each end thereof. The spring fingers carried by the bar 19, two in number, have directed through the eyes 18 thereof a connecting bar 25, while through the eyes 18 of the groups of spring fingers 16 directly attached to the bar 10 at opposite sides of the bar 19 are directed other connecting bars 26. One of these connecting bars, the inner end of which corresponds in positioning to the hinged connection 20 of the bar 19 to the bar 10, is pivotally connected, as at 27, to the adjacent end of the bar 25, while the other of the bars 26 is provided with a hook 28 constructed similarly to the hook 22 of the bar 10 and coacting with an eye 29 upon the adjacent end of the bar 25. This bar adjacent the eye is provided with a spring latch 30 similar to the spring latch 24 previously described. It will be obvious that when the hooks are engaged in the eyes the central section, as represented by the spring fingers connecting the bars 25 and 19, is rigidified to the remaining spring fingers so that any shock applied to this section will be distributed through the remainder of the spring fingers. It will also be obvious that by simply disengaging these hooks this section may be swung back out of the way to permit engagement of the crank for starting the engine when this is necessary.

Secured to the frame 11 at opposite sides thereof and preferably by the U-bolts 13 are brackets 31 each having secured thereto a forwardly and upwardly inclining cylinder 32. This cylinder is provided at its forward end with a removable cap 33 having a squared central opening 34 formed therein. Located within the cylinder is a pneumatic and inflatable cushioning element 35 having an inflating valve 36 projecting through an opening formed in the rear end of the cylinder, as indicated at 37. Within each cylinder and abutting the cushioning element 35 thereof is a piston 38 having a squared rod 39 directed through the opening 33 of the cap. To the outer end of this rod is secured a clamp 40 in which is arranged a pad 41 of cushioning material having in its front face a notch 42 for the reception of the opposed portion of the bar 26 at the corresponding side of the vehicle. This notch is held in proper alignment with the bar and to receive the bar by the construction of the stem and head of the cylinder which prevents relative rotation thereof. It will be obvious that any severe shock imparted to the spring fingers 16 will be transmitted through the connecting bars 25 and 26 thereof to the piston 38 and will be expended upon the cushioning element 35. By this construction the use of a much lighter spring finger 16 is allowed with the advantage that articles or persons coming into contact are much less liable to be damaged.

It will be obvious that by the construction hereinbefore set forth all the protection is provided for the vehicle which is afforded by the ordinary rigid bar fender and the likelihood of damage or injury to other vehicles or persons collided with is considerably reduced. It will furthermore be obvious that this structure is capable of a certain range of change and modification without materially departing from the spirit of my invention and I accordingly do not limit myself to such specific structure as hereinbefore set forth except as hereinafter claimed.

I claim:—

1. In combination with a vehicle, a rigid member extending transversely of the vehicle in spaced relation to the forward end of the vehicle and supported from the frame of the vehicle, a cushioning element carried by the front face of the rigid member, a plurality of resilient fingers extending upwardly and rearwardly from the rigid member and supported at their lower ends thereby, and bars connecting the upper ends of said resilient fingers.

2. In combination with a vehicle, a rigid member extending transversely of the vehicle in spaced relation to the forward end of the vehicle and supported from the frame of the vehicle, a cushioning element carried by the front face of the rigid member, a plurality of resilient fingers extending upwardly and rearwardly from the rigid member and supported at their lower ends thereby, and bars connecting the upper ends of said resilient fingers, said bars including side bars and a central bar, the central bar being pivoted at one end to the side bars and being detachably engaged at the opposite end to the other of the side bars, the fingers secured to said central bar being connected at their lower ends by a rigid bar pivotally supported at one end from the rigid member and detachably engaged therewith at the opposite end.

3. In combination with a vehicle, a rigid member extending transversely of the vehicle in spaced relation to the forward end of the vehicle and supported from the frame of the vehicle, a cushioning element carried by the front face of the rigid member, a plurality of resilient fingers extending upwardly and rearwardly from the rigid member and supported at their lower ends thereby, bars connecting the upper ends of said resilient fingers, and cushioning elements connecting said bars with the frame of the vehicle.

4. In combination with a vehicle, a rigid member extending transversely of the vehicle in spaced relation to the forward end of the vehicle and supported from the frame of the vehicle, a cushioning element carried by the front face of the rigid member, a plurality of resilient fingers extending upwardly and rearwardly from the rigid member and supported at their lower ends thereby, bars connecting the upper ends of said resilient fingers, cushioning elements connecting said bars with the frame of the vehicle, and common securing means for attaching the supports of said rigid bar and said cushioning elements to the frame of the vehicle.

5. In combination with a vehicle, a rigid member extending transversely of the vehicle in spaced relation to the forward end of the vehicle and supported from the frame of the vehicle, a cushioning element carried by the front face of the rigid member, a plurality of resilient fingers extending upwardly and rearwardly from the rigid member and supported at their lower ends thereby, bars connecting the upper ends of said resilient fingers, cushioning elements connecting said bars with the frame of the vehicle including a cylinder, a piston therein, means for yieldably resisting the movement of the piston in one direction, and a rod for the piston engaging the bar.

6. In combination with a vehicle, a rigid member extending transversely of the vehicle in spaced relation to the forward end of the vehicle and supported from the frame of the vehicle, a cushioning element carried by the front face of the rigid member, a plurality of resilient fingers extending upwardly and rearwardly from the rigid member and supported at their lower ends thereby, bars connecting the upper ends of said resilient fingers, cushioning elements connecting said bars with the frame of the vehicle including a cylinder, a piston therein, means for yieldably resisting the movement of the piston in one direction, a rod for the piston provided at its forward end with a cushioning element having a notch receiving the bar, and means for preventing rotation of the rod.

In testimony whereof I hereunto affix my signature.

AMBROSE J. FINNEGAN.